UNITED STATES PATENT OFFICE.

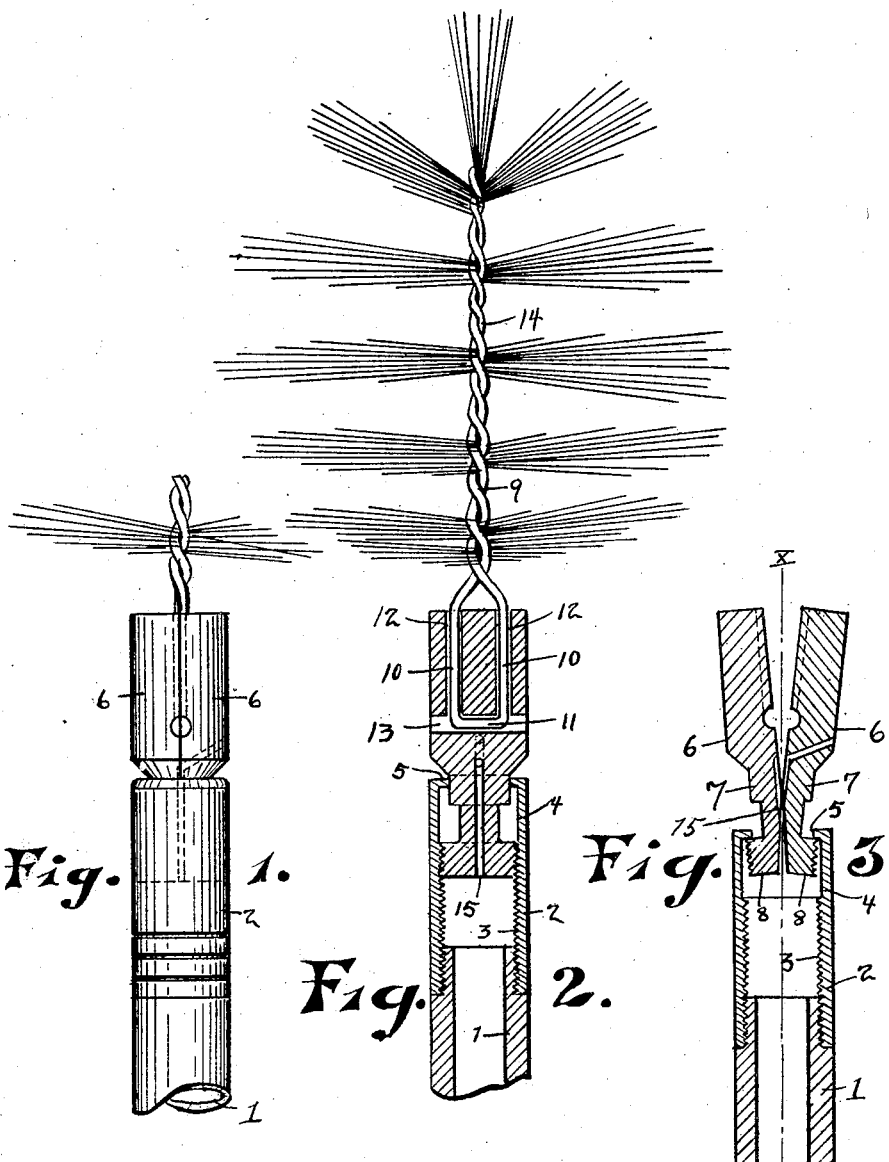

RUDOLPH FEHLER, OF MILWAUKEE, WISCONSIN.

BRUSH-HOLDER.

No. 877,990.  Specification of Letters Patent.  Patented Feb. 4, 1908.

Application filed February 23, 1907. Serial No. 358,804.

*To all whom it may concern:*

Be it known that I, RUDOLPH FEHLER, a citizen of the United States, residing at Milwaukee, county of Milwaukee, and State of Wisconsin, have invented new and useful Improvements in Brush-Holders, of which the following is a specification.

My invention relates to improvements in that class of brush holders which are adapted to be used in connection with a rotary water duct of a bottle washing machine, and it pertains more especially to the construction of the shank of the brush and the shank engaging jaws of the duct which coöperate to hold the brush rigidly in place in line with the duct and prevent the same from wabbling as it is being rapidly rotated against the interior walls of a bottle.

The construction of my invention is explained by reference to the accompanying drawings, in which, Figure 1 is a side view, showing the jaws of the duct closed around the shank of the brush. Fig. 2 represents a vertical section of the duct and jaws drawn on line X—X of Fig. 3 in connection with the brush, the jaws being in their closed position. Fig. 3 represents a vertical section of the duct and clamping jaws drawn at right angles to that shown in Fig. 2 with the brush removed, and Fig. 4 is a top view of the clamping jaws.

Like parts are identified by the same reference figures throughout the several views.

The duct 1, tubular sleeve 2, provided with an internal threaded portion 3 and unthreaded portion 4, inwardly projecting annular flange 5, the two opposing jaws 6, 6, provided with grooves and water duct 15, the jaw supporting shank formed of two separable parts 7, 7, and the screw threaded shoulders 8, 8, adapted to operate in the bearings 3 of the sleeve, form the subject matter of a separate pending application and are not involved herein.

The present invention consists more especially, as above stated, to the peculiar construction of the elongated loop of the brush retaining shank 9 and the loop retaining jaws 6 by which the shank 9 is rigidly retained in place in line with the duct. The loop comprises the two parallel side portions 10, 10 and the transverse central portion 11, which parts 10 and 11 are formed integrally with the shank 9 of a single piece of wire. The jaws 6, 6, are respectively provided with two longitudinal grooves 12, 12, formed for the reception of the side portions 10 and the transverse groove 13 formed for the reception of the central portion 11 of said loop.

It will be understood that when desirous to connect the jaws with the shank of the brush 14, they are thrown apart by turning said jaws forward until the shoulders 8 are disengaged from the threaded portion 3 of the sleeve when said jaws are free to open as shown in Fig. 3. This being done the shank is inserted between the jaws in such a manner that the side portions 10, 10, engage in the longitudinal grooves 12 and the central portion 11 engages in the transverse groove 13. This being done the screw threaded shoulders 8 are screwed into the walls of the sleeve 2, whereby the sides of the jaws are brought together and caused to impinge against and rigidly hold the loop in place between them as indicated in Fig. 1, whereby the brush 14 is rigidly held in place in line with the duct 1, as previously stated. When desirous to remove the brush, the jaws are turned forward from the position shown in Fig. 2 to that shown in Fig. 3 when they are free to separate. When the loop is released from the jaws the brush may be readily removed. It will be understood that the duct 1 is adapted to be connected with a water supply, not shown, through which water is led from such supply through the groove, 15 to the brush and that the brush is adapted to be simultaneously used with a large number of others of like construction with the class of bottle washing machines which are used by brewers and soda water manufacturers for washing bottles the grooves 15 are formed in the opposing sides of the jaws 6, 6, and when said jaws are together said grooves for a longitudinal duct which terminates upwardly at an angle to the vertical through one of said jaws and thus forms a passage through which the water flows from the duct 1 to the brush.

Having thus described my invention what I claim as new and desire to secure by Letters Patent is,

1. In a brush holder for bottle washing machines a tubular sleeve adapted to be connected with a revoluble water duct, a pair of brush retaining jaws of similar size and shape respectively provided with a pair of longitudinal grooves and a transverse groove in combination with a brush provided with a longitudinal loop, the respective sides and end portions of said loop being adapted respectively to register with and be supported by and within the longitudinal and transverse grooves of said jaws.

2. In a brush holder of the class described, a pair of jaws pivotally supported in connection with the discharge end of a revoluble tubular duct, said jaws being respectively provided with a pair of parallel longitudinal grooves and a transverse groove in combination with the supporting loop of a rotary brush shank, the side and end portions of said loop being adapted to register with and be supported by and within the longitudinal and transverse grooves of said jaws and means for locking said jaws around and in contact with the loop of said shank.

In testimony whereof I affix my signature in the presence of two witnesses.

RUDOLPH FEHLER.

Witnesses:
JAS. B. ERWIN,
M. M. SCHULZ.